United States Patent
Momber

Patent Number: 5,660,328
Date of Patent: Aug. 26, 1997

[54] WATER HEATER CONTROL

[75] Inventor: Gregory J. Momber, Grand Rapids, Mich.

[73] Assignee: Robertshaw Controls Company, Richmond, Va.

[21] Appl. No.: 592,254

[22] Filed: Jan. 26, 1996

[51] Int. Cl.$^6$ .................... F23N 1/08; H05B 1/02
[52] U.S. Cl. .............. 236/20 R; 236/46 R; 126/374; 219/492
[58] Field of Search .................. 236/46 R, 20 R, 236/21 B; 219/492; 126/374 V

[56] References Cited

U.S. PATENT DOCUMENTS 4,832,259  5/1989  Vanermeyden ............ 236/20 R
4,834,284  5/1989  Vandermeyden ........... 236/20 R

FOREIGN PATENT DOCUMENTS 5099503  4/1993  Japan ................ 236/20 R

Primary Examiner—William E. Wayner
Attorney, Agent, or Firm—Fulbright & Jaworski LLP

[57] ABSTRACT

A water heater control modifies a temperature differential setting in a hot water heater according to elapsed time between calls for heat. This allows the temperature setting of the hot water heater to remain low, which reduces the risk of scalding, yet allows the hot water heater to deliver hot water consistently. For example, a hot water heater temperature setting is 120° F. and the temperature differential is normally set to 20° F. After six hours without a call for heat, during which time period the water in the tank has destratified, the water heater control could set the differential to 15° F., which would cause a call for heat when the water temperature drops to 105° F. Once a call for heat is generated, the temperature differential can be set back to 20° F. Thus, water stratification is reduced because a wide temperature differential is maintained during periods when there are repeated calls for heat, but cool water is avoided because the differential is narrowed during periods of inactivity.

20 Claims, 4 Drawing Sheets

WATER HEATER CONTROL

BACKGROUND OF THE INVENTION

1. Field of the Invention

The present invention relates to a control for a hot water heater. In particular, this invention is directed towards a method and apparatus for varying the temperature differential of a hot water heater to maintain a more consistent temperature throughout various hot water usage periods.

2. Discussion of the Related Technology

In a typical water heater design, cold water enters at the bottom of a hot water heater tank and hot water exits out of the top of the tank. When cold water rises to the level of a control sensor, a call for heat will be generated. When a water heater is subjected to repeated short draws of water, such that the water draw stops shortly after a call for heat is generated, the water temperature in the tank will stratify or "stack" with up to a 40° F. water temperature differential from the control sensor to the top of the tank. Stacking produces a scald risk, because the water exiting the top of the tank is much hotter than the temperature setting at the control sensor.

Stacking can be reduced by setting a wide temperature differential at the hot water heater to allow more cold water into the tank before initiating a call for heat. Wide differential settings, however, also result in cold water complaints in the morning. Over a few hours of inactivity, water in a tank will destratify and cool off. If a demand for hot water occurs before the tank generates a call for heat, the water will be cool, and this may generate complaints. For example, a hot water heater is set to 120° F. and the differential is set to 20° F. Water in the tank may cool to 101° F. overnight. If there is a demand for hot water in the morning, cool 101° F. water will exit the top of the tank and cause complaints.

A narrower differential setting, on the other hand, decreases energy efficiency, because a water heater turns on more often when a narrow differential is set. Setting a hot water heater to a higher temperature does not decrease energy efficiency, however, it greatly increases the risk of scalding. Thus, there is a need for a water heater control that reduces stacking effects in a water heater yet maintains a comfortable hot water temperature.

SUMMARY OF THE INVENTION

A water heater control modifies a temperature differential setting in a hot water heater according to elapsed time between calls for heat. This allows the temperature setting of the hot water heater to remain low, which reduces the risk of scalding, yet allows the hot water heater to deliver hot water consistently. For example, a hot water heater temperature setting is 120° F. and the temperature differential is normally set to 20° F. After six hours without a call for heat, during which time period the water in the tank has destratified, the water heater control could set the differential to 15° F. which would cause a call for heat when the water temperature drops to 105° F. Once a call for heat is generated, the temperature differential can be set back to 20° F. Thus, stacking is reduced because a wide temperature differential is maintained during periods when there are repeated calls for heat, but cool water is avoided because the differential is narrowed during periods of inactivity.

An advantage is that it allows a lower temperature setting with a low scald risk yet maintains consistently hot water at virtually no additional cost, even after a period when there has been no demands for hot water. Another advantage is that it promotes a wide differential, which increases energy efficiency. Another advantage is that the expense of a "real time" control is avoided, because the control depends on elapsed time rather than time of day.

BRIEF DESCRIPTION OF THE DRAWINGS

FIG. 2 shows the association of FIGS. 2A & 2B.

DETAILED DESCRIPTION OF THE PREFERRED EMBODIMENT

Figure 1:
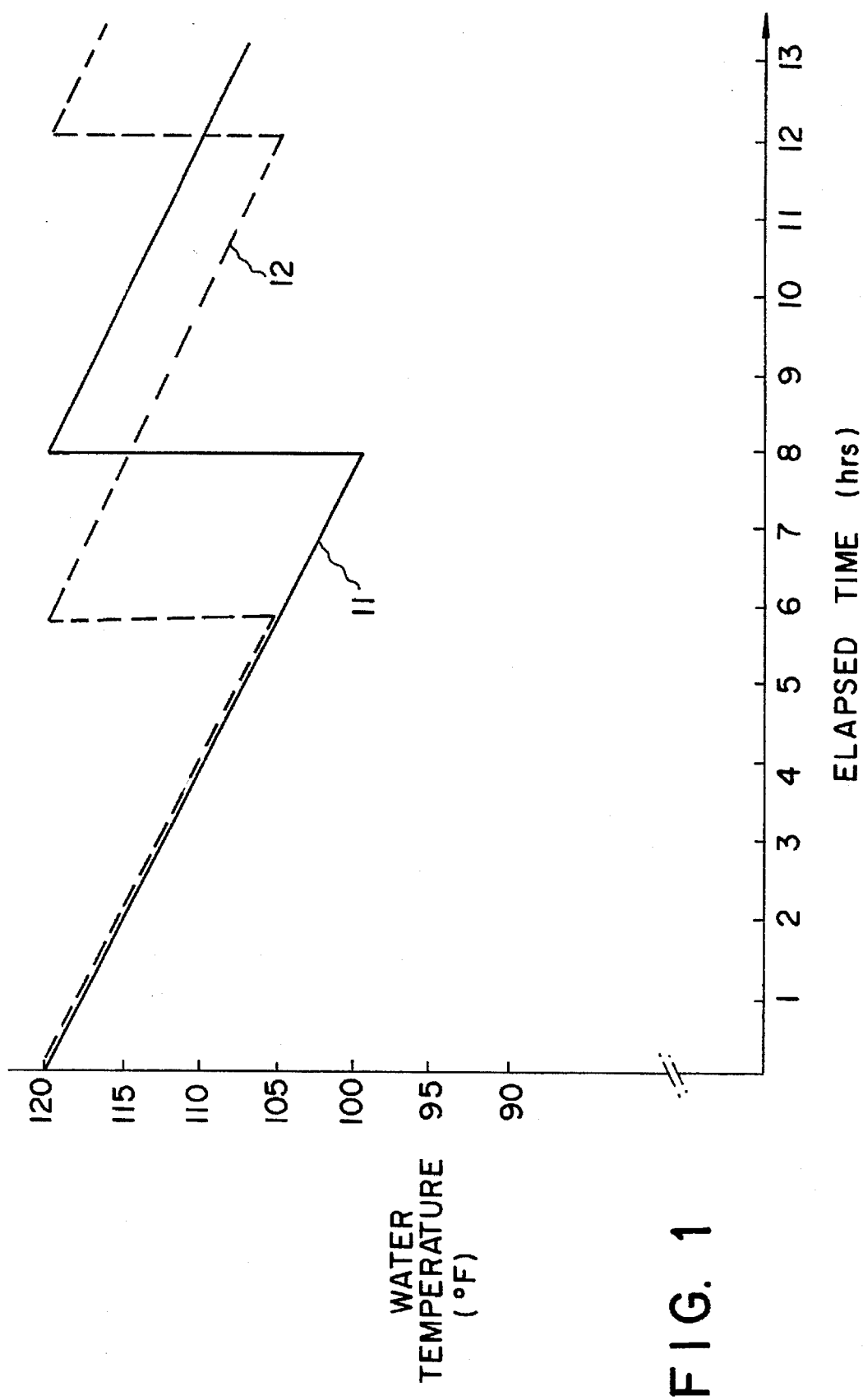
FIG. 1 shows a graph of water temperature versus time for a typical water heater an a water heater with a water heater control in accordance with the preferred embodiment.

FIG. 1 shows a graph of water temperature versus time for a typical water heater and a water heater with a water heater control in accordance with the preferred embodiment. Elapsed time in hours is shown on the X-axis and water temperature in degrees Fahrenheit is shown on the Y-axis.

Water temperatures may vary during the day in accordance with the differential setting of a hot water heater. After a period of inactivity, the water in a hot water tank destratifies and cools. When the water cools to a temperature as set by a temperature setting and a differential setting, a call for heat is generated, and the water in the tank is heated to a temperature as set by the temperature setting. In the graph, the temperature setting is 120° F. and the differential setting is 20° F. Over 8 hours without a call for heat, water in the tank cools to 100° F. as shown by solid line 11. At this point, a call for heat is generated, and the water is heated back to 120° F. If a demand for hot water occurs after 7.5 hours of elapsed time, water emerging from the hot water heater at approximately 103° F. will be considered unacceptably cool.

A water heater with a water heater control in accordance with the preferred embodiment modifies the differential setting after 6 hours of elapsed time. As shown in the graph by dashed line 12, after 6 hours without a call for heat, the differential setting is reduced from 20° F. to 15° F. Thus, if a demand for hot water occurs after 7.5 hours of elapsed time, water emerging from the hot water heater will be at approximately 115° F.

The amount of time elapsed before the temperature differential is adjusted is not critical. Preferably, however, the elapsed time allows for the water to destratify so that stacking is avoided. Also, the adjustment to the temperature differential is not critical. In this graph, the adjustment is shown to be 5° F., however, other adjustments may be implemented.

Figures 2, 2A:
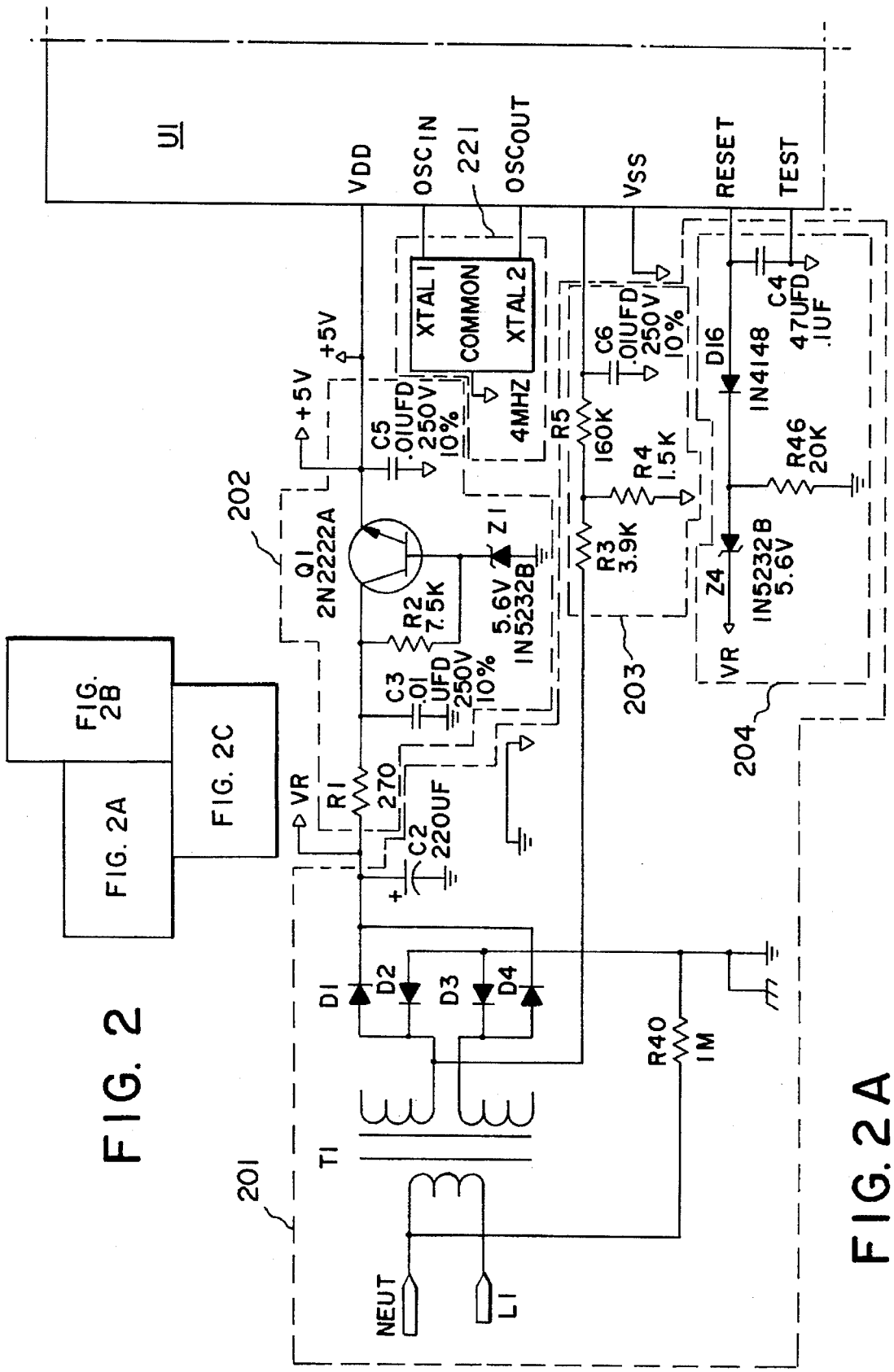
FIG. 2 shows the arrangement of FIGS. 2A, 2B and 2C.
FIGS. 2A, 2B and 2C show a diagram of a water heater control in accordance with the preferred embodiment.
Figure 2B:
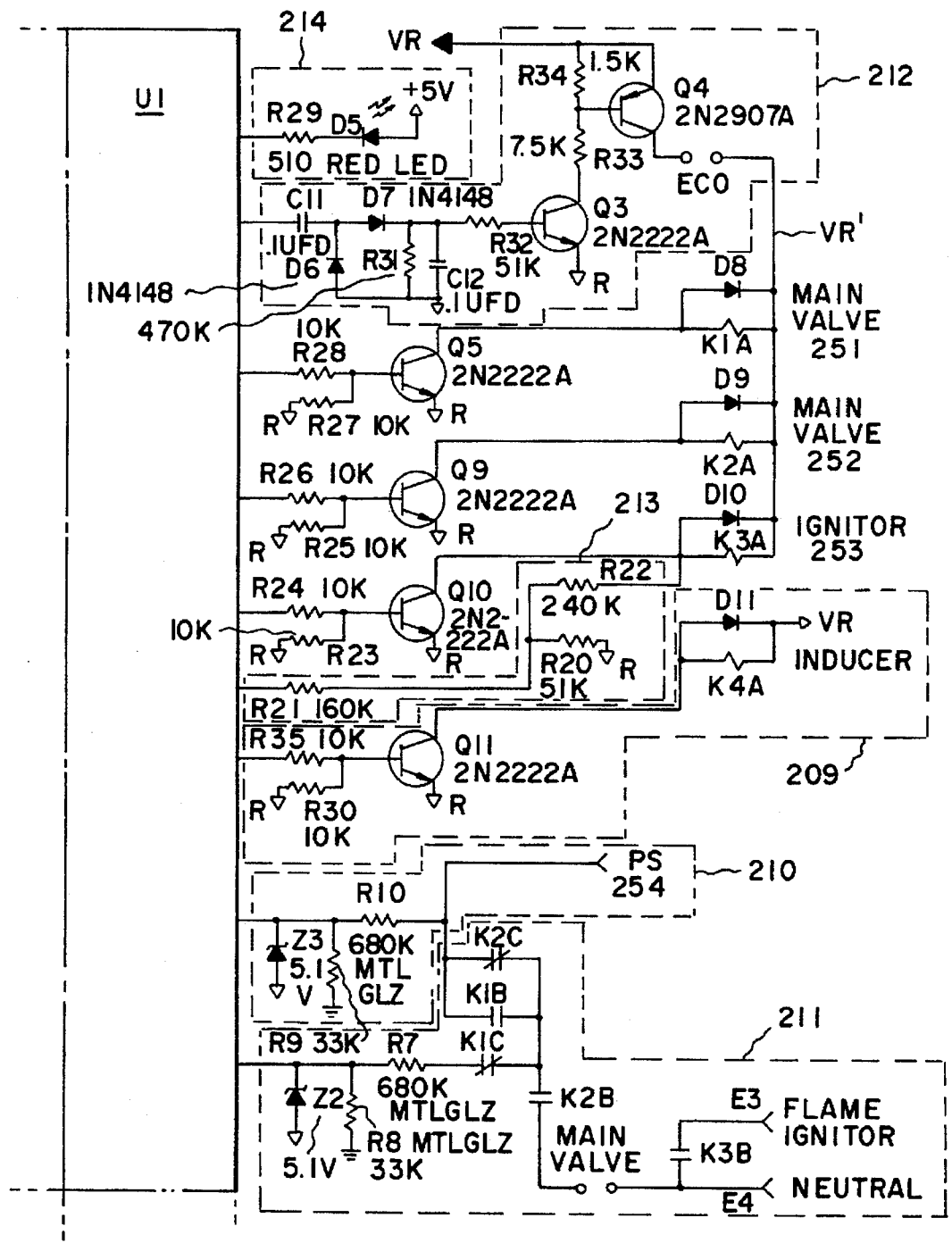
Figure 2C:
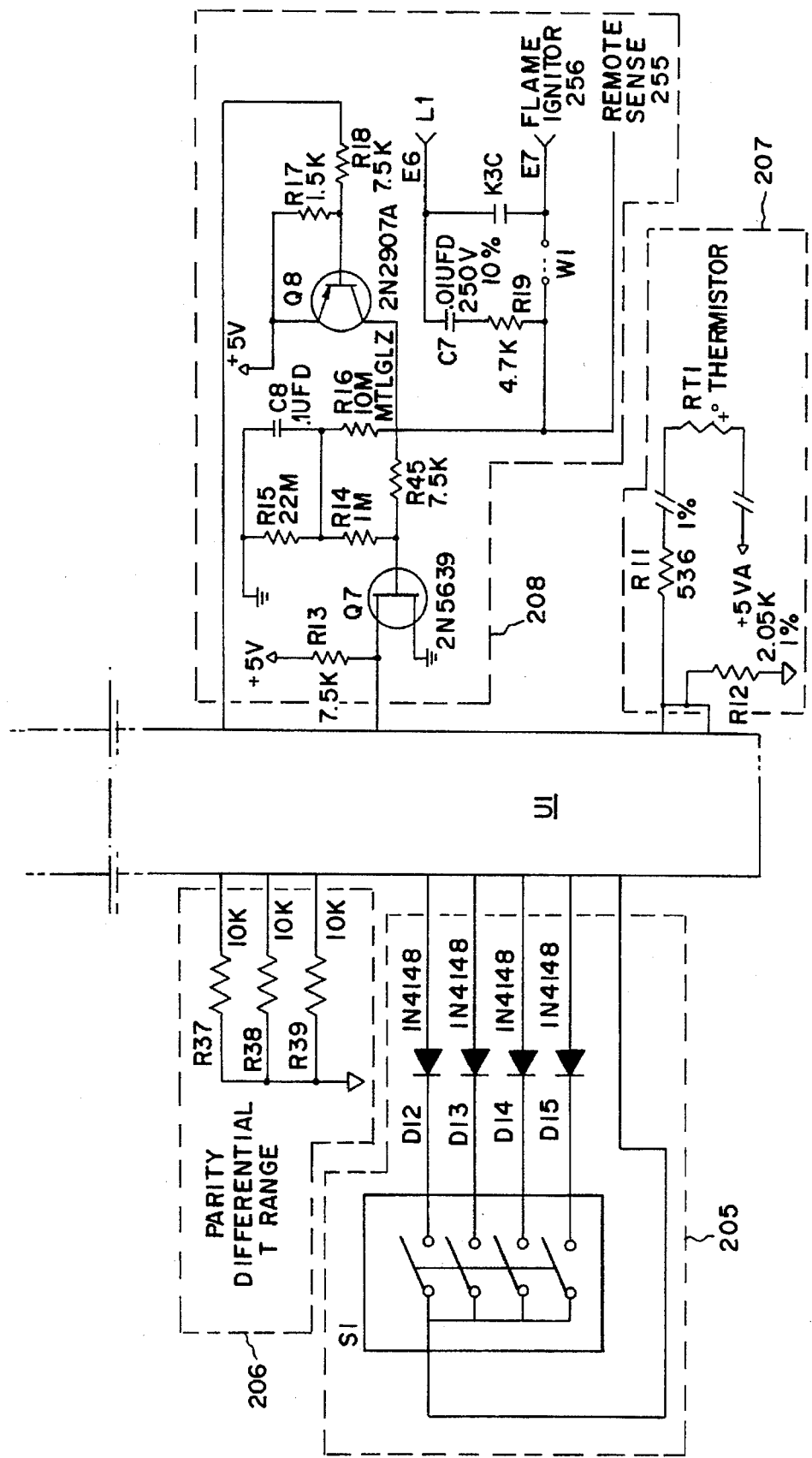

FIGS. 2A and 2B show a diagram of a water heater control in accordance with the preferred embodiment. A microcontroller U1, such as an SGS ST6225, has an analog-to-digital (A/D) convertor, a ROM, one-time programmable (OTP) support, a high level of immunity to electrical noise, and a wide voltage and temperature range of use. Microcontroller U1 controls an ignition source through ignitor relay 253 and a gas valve through main valve relays 251, 252 to control the water temperature in the hot water heater tank.

Power supply circuit 201 of the microcontroller U1 includes a full wave bridge made of diodes D1, D2, D3, D4, capacitor C2, resistor R40, and transformer T1. A supply voltage is preferably 18 V AC under full load conditions. This supply voltage is used for relays 251, 252, 253 (shown in FIG. 2B), and it is also the source of power for the 5 volt series pass regulator circuit 202. Series pass regulator circuit 202 has resistors R1, R2, zener diode Z1, and transistor Q1. Capacitor C3 is a high frequency bypass capacitor to attenuate noise into the transistor. Capacitor C5 is used as a high frequency decoupling capacitor for the microcontroller.

The power supply circuit 201 also includes a 60 Hz reference circuit 203 and a reset circuit 204. The 60 Hz reference circuit 203 has resistors R3, R4, R5 and capacitor C6. Resistors R3 and R4 form a simple voltage divider limiting the voltage to the microcontroller power supply range. Resistor R5 is a current-limiting resistor for the microcontroller in the event that the voltage exceeds the microcontroller power supply voltage. Resistor R5 and capacitor C6 form a low pass filter to eliminate any high frequency noise.

The reset circuit 204 has zener diode Z4, capacitor C4, resistor R46, and diode D16. The microcontroller U1 contains an internal resistor and a watchdog circuit that can reset the microcontroller U1 in the event of a software time out. Basically, capacitor C4 is charged through the internal resistor. The internal resistor and resistor R46 form a voltage divider with diode D16, which allows the voltage to rise to 5.0 volts. Zener diode Z4 is utilized to ensure that capacitor C4 discharges quickly so that when power dips, the microcontroller will not need a reset; or one will be properly generated.

Preferably, the temperature settings on the control are limited to 5° F. steps and the range is from 90° F. to 140° F. or 90° F. to 160° F. Temperature setting circuit 205 uses switch S1 and diodes D12, D13, D14, D15 to determine the desired temperature. Switch S1 is a simple four-bit binary switch with a special layout to ensure that the binary combinations in-between positions are defined to be a lower temperature, rather than a higher temperature. Diodes D12, D13, D14, D15 are used to isolate the microcontroller input/output from the switch S1 to help detect possible fault conditions. The microcontroller can perform a diagnostic computer program to determine if any pins on the microcontroller are shorted.

Option selection circuit 206 has resistors R37, R38, R39. Resistor R38 controls whether the temperature differential is 15° F. or 20° F. Resistor R39 controls whether the maximum temperature setting is 140° F. or 160° F. Resistor R37 m used as a parity adjustment and is considered "high" or "1" when not installed. In this embodiment, the parity of all combined bits should be odd. In other words, if a single resistor is installed then the parity is odd and resistor R37 is not installed. If two resistors are installed, then resistor R37 is installed. In this embodiment, if resistor R38 is installed a 20° F. differential is set, and if resistor R38 is not installed a 15° F. differential is set. If resistor R39 is installed a 160° F. maximum temperature range is set, and if resistor R39 is not installed a 140° F. maximum temperature range is set.

Oscillator circuit 221 is used to determine the elapsed time between calls for heat. If a certain amount of time, such as six hours, has elapsed without a call for heat, software in the microcontroller U1 controls a change in the differential setting. For example, the differential setting could be lowered by a predetermined amount, such as 5° F., or the differential setting could be changed to a different value, such as 12° F. Once a call for heat is generated, the differential is reset to the differential chosen by the option selection circuit 206. With an additional expense, the oscillator circuit could also be used by the software to determine time of day. A hot water heater could be controlled to narrow a temperature differential at a specific time of day, such as 6:00 a.m., shortly before a demand for hot water occurs.

Temperature sensor circuit 207 includes thermistor RT1 located at the control sensor of the tank. The control must be able to measure temperature accurately in order to control the temperature accurately. The control sensor is capable of measuring temperature to one degree with an overall accuracy of ±2.5° F. when measured with respect to the thermistor. The thermistor RT1 has a negative temperature coefficient "J" curve and has an absolute accuracy of ±1° F. Thermistors tend to be nonlinear and therefore must be linearized. The easiest (and most economical) method to linearize a thermistor is to select two resistors R11, R12 that linearize the thermistor for the range of interest. The resistance of resistors R11 and R12 when combined with the thermistor RT1 determines the slope, and the ratio of R11 and R12 when combined with the thermistor RT1 determines the offset. This allows the microcontroller's A/D convertor to perform a direct conversion where 1° F. equals one bit of the A/D convertor. Other conversion schemes, however, may be used.

Software running on the microcontroller can measure and average the temperature reading many hundreds of times and then compare multiple averaged readings to ensure that the temperature reading is accurate. When the measured temperature is lower than the temperature setting minus the temperature differential setting, as set by option selection circuit 206, microcontroller U1 will activate main valve and ignitor relays 251, 252, 253 to heat the water in the tank. When the measured temperature is approximately equal to the temperature setting, the microcontroller will cease the heating of the water. Because the microcontroller in this embodiment has only one degree of resolution, and the microcontroller must round off to the nearest whole bit, the unit will actually shut down 0.5° F. before it reaches the set temperature. By adjusting the resistors in the temperature sensor circuit, however, this may easily be modified.

A flame sense circuit 208 utilizes the Flame Rectification principle to detect the absence or presence of flame. The flame sense circuit used in this control is an excellent enhancement of previous flame sense circuits. This flame sense circuit uses the same principles as previous circuits, except the "flanging" transistor Q8 is driven by a microcontroller instead of a 50/60 Hz sine wave. With the 50/60 Hz sine wave, transistor Q8 would basically be on at a 50% duty cycle, and this 50% duty cycle was used for calculations in designing for flame sensitivity and flame failure response time. With transistor Q8 driven by microcontroller U1, the duty cycle can be varied via pulse width modulation (PWM). The result is that the microcontroller can use PWM to not only detect the presence of flame sense current, but quantify the amount of flame sense current detected. This means the microcontroller could detect the amount of flame sense current and log this information for future comparisons to support adaptability, this data could be available to a field service technician for trouble shooting, and the microcontroller could also inform the user if the control is operating below a specified flame sense current.

The field-effect transistor (FET) Q7 in this flame sense circuit 208 could be replaced with a CMOS gate. The advantage of using an FET is that the FET requires a negative voltage to operate, and because there are no negative voltages on the control, the only way it can be produced is to truly have flame present for detection. This is an additional level of safety built into the control. The advantage of a CMOS gate is basically lower cost and higher availability.

The basic components used for Flame Rectification are capacitors C7, C8, resistors R16, R19, and AC line voltage L1. When flame is indicated as not present at remote sense node 255 (or flame ignitor node 256 when circuit 208 is used in the local sense, i.e., connection W1 is installed) the voltage across capacitor C8 is an average of 0 volts DC, because capacitor C8 and resistor R16 form a low pass filter for AC. When flame is present at the remote sense node 255, the remote sensor basically looks like a diode (cathode tied to ground) and a high resistance in series. When this condition occurs, current will flow from AC line voltage L1 through capacitor C7, resistor R19, and the flame. The amount of current that flows is basically dependent upon the flame resistance. Flame resistance will cause capacitor C7 to start to develop a positive DC voltage during the positive portion of the AC sine wave. Then, because the flame does not allow current to flow during the negative portion of the AC sine wave, capacitor C8 will see a more negative voltage peak (peak sine voltage plus capacitor C7 voltage). This occurs 60 times a second, and at each positive cycle, capacitor C7 will develop a more positive voltage. This process will eventually cause a negative voltage to be developed across capacitor C8. This negative voltage causes the FET Q7 to turn "off" when the voltage exceeds the gate-source threshold voltage. When the FET Q7 is off, resistor R13 pulls pin 20 on the microcontroller U1 "high" or "1", indicating the presence of a negative voltage on the gate of FET Q7. These basic components are all that is required to detect the presence of flame.

Note that AC line voltage L1 supplies power to flame ignitor node 256 to cause combustion only after normally open switch K3C closes. Switch K3C reopens after the ignitor warm-up period has elapsed.

The other components in flame sense circuit 208 are used to remove the voltage on capacitor C8 in a safe manner and in a reasonable amount of time. Resistor R15 is used to discharge capacitor C8 when power is off, or during the off time of transistor Q8. Resistor R17 is merely a pull-up resistor for transistor Q8, and resistor R18 is a base current-limiting resistor for transistor Q8. Transistor Q8 is a switch used in an unconventional manner. When transistor Q8 is "on," a positive voltage is applied to the gate of transistor Q7 and hence causes the FET's gate-source diode to be forward-biased at about +0.6 voltages. Resistor R45 is utilized to limit the current through transistors Q7 and Q8. When transistor Q8 is "on," capacitor C8 discharges through resistor R14, through the FET Q7 gate-source diode, and back to ground. The microcontroller then can vary the duty cycle of transistor Q8 to try to maintain a net voltage on capacitor C8 equal to the FET's threshold voltages. It is this process that allows the microcontroller to quantify the amount of flame resistance.

The control has several relay drive circuits. Inducer relay circuit 209 with inducer relay K4A is energized by turning on transistor Q11. Resistor R30 is simple a pull-down resistor while resistor R35 is the base drive current-limiting resistor. Diode D11 is used as a flyback catch diode for the relay K4A.

Pressure switch feedback circuit 210 has resistors R9, R10 and zener diode Z3 connected to pressure switch input 254. Resistors R9 and R10 form a voltage divider to limit the line voltage to a level acceptable to microcontroller U1. Zener diode Z3 is used to limit the voltage to 5.1 volts maximum.

The main valve feedback circuit 211 uses feedback resistors R7, R8, zener diode Z2, and normally closed contacts K1C, K2C to test the various sections of the circuitry. Resistors R7, R8 form a voltage divider to limit the line voltage to a level acceptable to the microcontroller. Zener diode Z2 is used to limit the voltage to 5.1 volts maximum. The normally closed contacts K1C, K2C of the form "C" relays can only be closed if the normally open contacts K1B, K2B are not closed.

Watchdog circuit 212 has capacitors C11, C12, diodes D6, D7, resistors R31, R32, R33, R34, and transistors Q3, Q4. When microcontroller U1 pin connected to capacitor C11 goes to 5 volts, capacitors C11, C12 form a voltage divider (less the diode D7 voltage drop) and approximately 2.2 volts becomes available at the C12/R32 node. If 5 volts remains at the microcontroller U1 output, then capacitor C11 will eventually charge up and the C12/R32 node will discharge through resistor R31 down to 0 volts. The microcontroller U1 then outputs 0 volts and discharges capacitor C11 through diode D6 down to 0.6 volts. This pulsing must continue in order to maintain a working voltage at C12/R32. This voltage energizes transistor Q3 which in turn energizes transistor Q4. Resistors R33 and R34 form a voltage divider. Resistor R33 limits the base drive current for transistor Q4, and resistor R34 is a pull-up resistor to ensnare that transistor Q4 is off when transistor Q3 is off.

The ECO is a one-time thermal switch set to 195° F. and is in series with the main valve relays 251, 252 and ignitor relay 253. If the temperature at the ECO should ever reach the setpoint of 195° F., the ECO will open and the main valve and ignitor relays will be de-energized. Note that relay voltage supply node VR is connected to node VR' through watchdog circuit 212 and the ECO switch.

Before microcontroller U1 energizes the inducer relay K4A in inducer circuit 209, it checks to make sure that the pressure switch input 254 is inactive using pressure switch feedback circuit 210. After the inducer relay K4A has been activated, then microcontroller U1 checks to make sure the pressure switch contacts are now active. If the acceptable conditions are met, then microcontroller U1 checks the main valve circuitry. The main valve feedback circuit 211 should always see a 60 Hz signal unless one of the relay contacts is active.

The next step is for microcontroller U1 to output a high or "1" to watchdog circuit 212. When a "1" is output to this circuit, a VR' feedback circuit 213 indicates if node VR' is high or low. VR' feedback circuit 213 includes resisters R20, R21, R22. With a DC level ("1" or "0"), the VR' feedback circuit 213 should be low, otherwise a fault condition exists. Then microcontroller U1 outputs a pulsed signal to watchdog circuit 212 and verifies that the VR' feedback circuit 213 is at a high or "1." If these conditions are met, microcontroller U1 then activates the ignitor relay 253 and verifies that the VR' feedback circuit 213 then goes low or "0." When the ignitor warm-up time is complete, microcontroller U1 will energize one of the main valve relays 251, 252. When either of the main valve relays are energized, the 60 Hz signal on the main valve feedback circuit 211 must cease, otherwise a fault condition exists.

Fault condition circuit 214 indicates fault conditions using LED D5. Resistor R29 is a current-limiting resistor for LED D5.

Although the present invention and its advantages have been described in detail, it should be understood that various changes, substitution, and alterations can be made herein without departing from the spirit and scope of the invention as defined by the appended claims.

What is claimed is:

1. A method for modifying operational parameters of a hot water heater controller comprising the steps of:

setting a temperature differential setting; and adjusting the temperature differential setting after a predetermined amount of time has elapsed without a call for heat.

2. A method of controlling a hot water heater according to claim 1 further comprising the step of:

resetting the temperature differential setting after a call for heat.

3. A method of controlling a hot water heater according to claim 1 wherein the step of adjusting comprises:

lowering the temperature differential setting by 5° F.

4. A method of controlling a hot water heater according to claim 1 further comprising the step of:

setting a temperature setting before the step of setting a temperature differential setting.

5. A method of controlling a hot water heater according to claim 4 further comprising the step of:

measuring a temperature in a hot water heater tank after the step of setting a temperature differential setting.

6. A method of controlling a hot water heater according to claim 5 further comprising the step of:

generating a call for heat after the step of measuring when the temperature in the hot water heater tank is lower than the temperature setting minus the temperature differential setting.

7. A method of controlling a hot water heater according to claim 6 further comprising the step of:

concluding the call for heat after the step of generating when the temperature in the hot water heater tank is approximately equal to the temperature setting.

8. A method of controlling a hot water heater according to claim 7 further comprising the step of:

resetting the temperature differential setting after the step of concluding.

9. A hot water heater control comprising:

a temperature differential setting circuit for setting a temperature differential setting; and a microcontroller for adjusting the temperature differential setting after a predetermined amount of time has elapsed since a call for heat.

10. A hot water heater control according to claim 9 further comprising:

a clock circuit for measuring the amount of time elapsed since a call for heat.

11. A hot water heater control according to claim 9, wherein the microcontroller resets the temperature differential setting after a call for heat.

12. A hot water heater control according to claim 9 further comprising:

a temperature setting circuit for setting a temperature setting.

13. A hot water heater control according to claim 9 further comprising:

a measuring circuit for measuring temperature of water in a hot water heater tank.

14. A hot water heater control according to claim 13, wherein the measuring circuit comprises:

a thermistor.

15. A hot water heater control according to claim 13, wherein the microcontroller generates a call for heat when the temperature of water in the hot water heater tank is lower than the temperature setting minus the temperature differential setting.

16. A hot water heater control according to claim 15 further comprising:

a main valve relay; and an ignitor relay, wherein the call for heat activates the main valve relay and the ignitor relay.

17. A hot water heater control according to claim 15, wherein the microcontroller concludes the call for heat when the temperature of water in the hot water heater tank is approximately equal to the temperature setting.

18. A hot water heater control according to claim 17, wherein the microcontroller resets the temperature differential setting after concluding the call for heat.

19. A water heating system, comprising:

a water heating tank in which water is heated by a water heating energy source; and a temperature differential setting circuit for setting a temperature differential value, and a microcontroller for adjusting the temperature differential value after a predetermined amount of time has elapsed since a call for heat.

20. A water heater system according to claim 19, wherein the temperature differential setting circuit further includes a clock circuit for measuring the amount of time elapsed since a call for heat.

* * * * *